April 24, 1973   J. MADGER   3,729,328
CELLULAR FOAMED MATERIAL AND METHOD
FOR THE MANUFACTURE THEREOF
Original Filed Sept. 23, 1968   2 Sheets-Sheet 1

United States Patent Office 3,729,328
Patented Apr. 24, 1973

3,729,328
CELLULAR FOAMED MATERIAL AND METHOD FOR THE MANUFACTURE THEREOF
Jules Magder, Princeton, N.J., assignor to Princeton Organics, Inc., Princeton, N.J.
Original application Sept. 23, 1968, Ser. No. 761,761, now Patent No. 3,565,647, dated Feb. 23, 1971. Divided and this application Oct. 19, 1970, Ser. No. 82,123
Int. Cl. C04b 21/12
U.S. Cl. 106—87                     6 Claims

ABSTRACT OF THE DISCLOSURE

A method for continuously producing foamed cement-based cellular material by subjecting specific liquid and solid components to high-shear mixing for very short periods of time and then discharging the mixture so that it can foam and set promptly. The liquid material which is mixed consists principally of water, and preferably has a viscosity of less than about 2.5 centipoises. The solid component which is mixed contains a particulate water-settable (hydraulic) cement and an inert particulate lamellar foam stabilizing agent. A gas-forming agent will also be included as part of either or both of the liquid and solid components. The time of mixing is not greater than about four seconds and preferably less than about one second, and the high-sheer mixing preferably provides a maximum nominal velocity gradient greater than about 500 seconds$^{-1}$ for substantially all of the material. The maximum nominal velocity gradient is defined for this purpose as the maximum value of the ratio of relative speed of two surfaces of the mixer between which substantially all of the mixture is passed, to the distance between said two surfaces. Preferably the mixer comprises a rotor disposed along the axis of the tubular chamber into which the ingredients to be mixed are continuously fed, the rotor comprising helical screw means disposed along the length of the rotor for moving the mixture through the chamber to its outlet and for providing at least part of the mixing action, together with mixing pins exending radially from the axis of the rotor to within a small distance of the chamber wall to effect further mixing action. The resultant product is of increased compressive strength and characterized by the fact that substantially all of the pore volume thereof is provided by pores having effective diameters outside a range extending from about two microns to about 300 microns, and preferably at least about 97% of the pore volume is provided by pores outside said range. There is also provided novel cellular products consisting essentially of high alumina cement, as the water settable cement, and the stated inert particulate lamellar foam stabilizing agent.

---

This application is a division of Ser. No. 761,761, filed Sept. 23, 1968, now U.S. Pat. 3,565,647.

BACKGROUND OF THE INVENTION

This invention relates to porous foamed materials based on water-settable cements and to methods of producing such materials. More particularly, the invention relates to methods for producing porous foamed materials by liberating gas in a water-settable slurry of material including an inorganic hydraulic cement such as portland cement, high alumina cement and calcined gypsum, and subsequently allowing the foamed mixture to set; it also relates, in particular, to a new form of such foamed material having a novel pore structure and to foamed material based specifically on a novel combination of high alumina cement and a particulate lamellar foam stabilizing agent.

There are a variety of methods known in the prior art whereby foamed solid materials are formed by effecting the chemical liberation of gas in a water-settable cementitious slurry and allowing the resultant foaming product to set. For example, slurries of calcined gypsum may be foamed by incorporating aluminum sulfate and calcium carbonate in the slurry, which releases carbon dioxide gas in the presence of the water of the slurry. Another known method of causing bubble formation is by the catalytic decomposition of hydrogen peroxide to oxygen by means of a manganese dioxide catalyst. In portland cement-based compositions, finely-divided metallic aluminum is often used as the gas-forming agent, functioning by releasing hydrogen gas under the strongly alkaline conditions which prevail in mixtures of water with portland cement.

Such porous foamed products are useful as light-weight building and insulating materials, particularly where fire-proof insulation is desired. In such materials, low cost is of course important and resistance to alkaline corrosion is also desirable. In many applications high compressive strength of the material is also very important. Uniform pore size, low permeability to moisture, high flexural strength and low friability are also desirable. In addition, it is often desirable to be able to produce the material in the location in which it is to be used, for example on existing buliding surfaces or in existing building cavities, and to be able to form and dispense the material rapidly and conveniently.

The usual methods for manufacturing foamed materials based on particulate water-settable inorganic materials use batch-mixing equipment in which one batch of slurry is mixed in a chamber and then completely discharged therefrom, the next batch introduced, mixed and discharged, and so on. This procedure has the disadvantage that typically only a few hunderd pounds or less of foamed material may be made at a time because of practical limitations on the size of the mixing container and the limited time avaialable for discharging the contents of the mixer before the liberated gas escapes or the slurry begins to set. The method is also less convenient than desirable for use in producing the material in the location in which it is to be used.

As to the material itself, the water-settable cement-based foamed materials of the prior art, containing hydraulic cements, such as portland cement, high alumina cement and gypsum, tend to have a lower compressive strength than is desirable in certain applications. While foamed materials based on other substances, such as aluminum-phosphate bonded wollastonite, are known and are characterized by relatively high compressive strengths, they require different starting materials than are employed in the present invention, which materials are generally costlier and, at least in many cases, are insufficiently resistant to alkaline corrosion.

Accordingly it is an object of the invention to provide a new and useful method for manufacturing foamed solid material.

Another object is to provide a new and useful foamed solid material.

A further object is to provide a new and improved method for manufacturing foamed solid materials based primarily on a water-settable inorganic cement, such as portland cement, high alumina cement and gypsum.

It also is an object to provide such a method which is capable of producing foamed materials continuously, rapidly and easily at different locations where the material is to be used.

Another object is to provide a continuous method of manufacturing foamed materials based on water-settable inorganic cements in which the material produced possesses improved compressive strength.

It is also an object to provide such a method which is capable of producing foamed material of improved flexural strength, low friability, low moisture permeability, high resistance to alkaline corrosion and highly-uniform pore size.

A further object is to provide a new and useful foamed solid material based on water-settable inorganic cements, such as portland cement, high alumina cement and gypsum, which material is characterized by improved compressive strength.

Another object is to provide such a new material characterized by more uniform pore size.

It is also an object to provide such a material which possesses reduced permeability to moisture, high flexural strength, low friability and high resistance to alkaline corrosion.

It is a specific object of the present invention to provide novel foamed solid materials consisting essentially of high alumina cement and a particulate lamellar foam stabilizing agent.

SUMMARY OF THE INVENTION

In accordance with the invention, these and other objects are achieved by the provision of a novel method for producing solid-foamed material in which particular substances are subjected to high-shear mixing during a very short mixing period before they are allowed to foam and set; and by the provision of a new water-set cellular foamed material of the type including a hydraulic cement, such as portland cement, high alumina cement and gypsum, which material has a specific novel pore structure.

More particularly, in accordance with the method aspect of the invention, a liquid consisting principally of water is delivered to a mixing chamber to which is also delivered, separately from the liquid, a finely-divided solid containing a particular water-settable cement, such as portland cement, high alumina cement and gypsum; also delievered to the mixing chamber are a gas-forming agent and a foam stabilizer comprising an inert particulate lamellar additive in an amount substantially equal to from about 0.2% to about 12%, by weight, based on the weight of the solid. Substantially all of the material in the chamber is subjected to high-shear mixing during a mixing period of not greater than about four seconds and preferably less than about one second, and them promptly discharged from the mixing chamber and allowed to foam and set. The high-shear mixing preferably provides a maximum nominal velocity gradient in the mixing chamber greater than about 500 seconds$^{-1}$ for substantially all of of the material in the chamber, where the maximum nominal velocity gradient is defined as the maximum value of the ratio of relative speed between two surfaces of said mixer between which said mixture is passed, to the distance between said two surfaces.

More particularly with respect to the novel material of the invention, substantially all of the pore volume of the foamed material is provided by pores having effective diameters outside a range extending from about two microns to about 300 microns. Preferably at least about 97% of the pore volume is provided by such pores, and in the preferred embodiment the greater part of the pore volume is provided by pores having effective diameters in the range from 1,000 to 3,000 microns.

Preferably also, the liquid and solids components of the mixture are delivered continuously to the mixing chamber, wherein they are continuously mixed and from which they are continuously discharged so long as the process is in operation. This is preferably accomplished by utilizing for the mixing operation a mixing chamber continuously fed with the solid and liquid components and comprising a rotor having helical screw means for continuously conveying the mixture to the discharge end of the mixing chamber and having mixing pins for enhancing the mixing action, the screw means and mixing pins of the rotor having a sufficiently small clearance from the inner walls of the mixing chamber to provide the desired high-shear mixing.

While not wishing to be limited by any specific theory, it is believed that the resultant improvement in the foamed material is due primarily to the fact that the high-shear mixing of the specified materials for a very short period of time militates against the product ion of small pores in the range from about 2 to 300 microns in effective diameter, and that it is these small pores in the walls between the larger pores which, in the prior-art materials, reduce the compressive strengths obtainable. In addition, the improved uniformity of pore size in the material of the invention also enhances the physical and mechanical characteristics thereof.

BRIEF DESCRIPTION OF FIGURES

These and other objects and features of the invention will become more readily apparent from a consideration of the following detailed description, taken in connection with the accompanying drawings, in which.

DETAILED DESCRIPTION OF PREFERRED EMBODIMENTS

Figure 1:
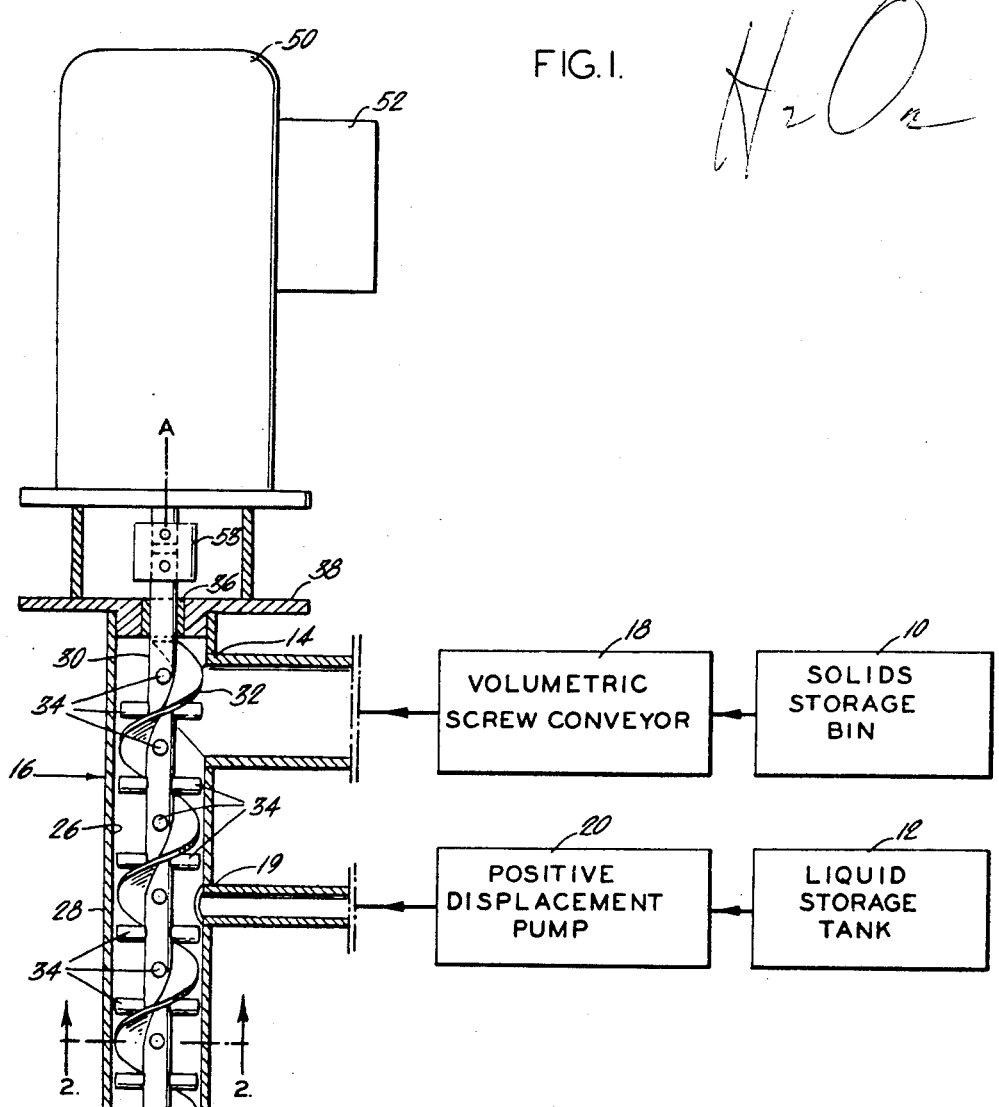
FIG. 1 is an elevational view, partly in section and partly in block form, illustrating one form of apparatus suitable for practicing the invention.
Figure 2:
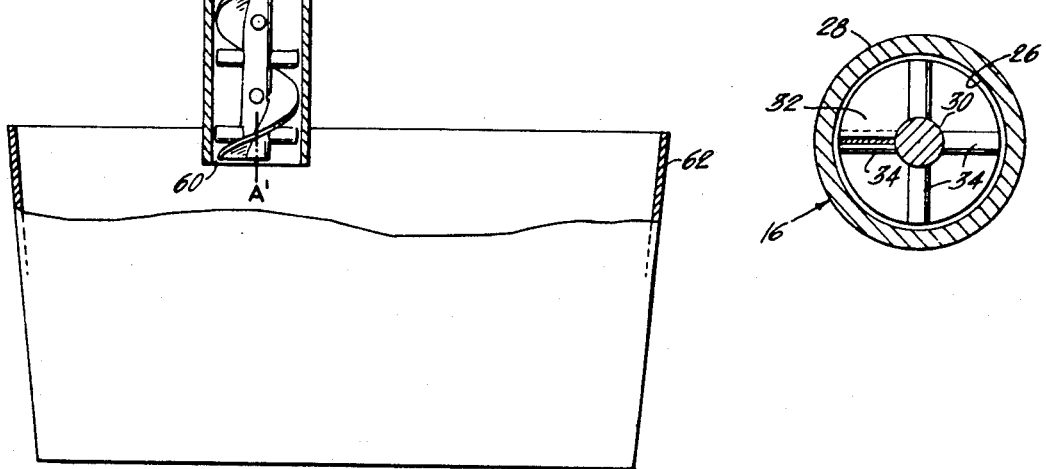
FIG. 2 is a cross-sectional view taken along lines 2—2 of FIG. 1.

Referring now by way of example only to the particular form of apparatus illustrated in FIG. 1 by means of which the method of the invention may be practiced and the product of the invention produced, the solid materials to be mixed are stored in a solids storage bin 10 and the liquid material to be mixed is stored in liquid storage tank 12. The solids are conveyed at a controlled rate to an inlet pipe 14 communicating with the interior of mixing chamber 16, by means of a volumetric screw conveyor 18. Liquid from tank 12 is conveyed to inlet pipe 19 of mixing chamber 16 by a positive displacement pump 20, which provides a controlled metered flow of the liquid into the mixing chamber. The materials in the solids storage bin 10 and the liquid storage tank 12 comprise the constituent materials described hereinafter which are to be mixed in chamber 16 to form the foamed end product, and it will be understood that any of a variety of conventional means may be used to deliver the solids and liquid components to the mixing chamber at controlled rates and that they may be so delivered to the mixing chamber through more than two inlets.

Mixing chamber 16 is formed by the inner wall 26 of a vertically-disposed cylindrical pipe 28. To effect the desired high-shear mixing of the solid and liquid components in the mixing chamber and to provide a short residence time for the mixture within the mixing chamber, there is employed a rapidly-rotatable mixer shaft 30 disposed along the axis of cylindrical pipe 28 throughout its length. A helical screw member 32 mounted on shaft 30 extends from above the solids inlet 14 to the lower end of cylindrical pipe 28, and a plurality of vertically-shaped, radially-extending mixing pins such as 34 are also affixed to shaft 30. The assembly of shaft 30, screw member 32 and pins 34 comprises a mixing rotor for effecting the desired mixing in chamber 16. Shaft 30 is mounted for rotation about its axis by means of a conventional bearing 36 mounted on a flanged closure member 38 which closes the upper end of chamber 16. Bearing 36 is positioned upstream of the inlets for solids and liquids, and the liquids inlet pipe 19 is preferably disposed downstream of the solids inlet pipe 14. An electric motor 50 with a conventional speed-control 52 is mounted on the closure member and drives shaft 30 in rotation by way of a mechanical coupling 53.

The inner wall 26 of chamber 16 in this embodiment is a right cylinder of revolution about the axis A–A' about which shaft 30 rotates, and the radially-outermost surfaces of screw member 32 and of mixing pins 34 are also preferably figures of revolution about axis A–A' and hence parallel to wall 26, and are spaced from wall 26 by a predetermined small amount to produce the desired high-shear mixing with a low residence time in the mixing chamber of no more than about four seconds and preferably less than about one second.

In operation, motor 50 is started and set at the speed producing optimum mixing and residence time; screw conveyor 18 and pump 20 are then turned on to deliver the necessary solid and liquid components to mixing chamber 16. Screw member 32 moves the material through chamber 16 to chamber outlet 60 in no more than about four seconds and preferably less than one second, during which time substantially all of the mixture is subjected to high-shear mixing by the mixing pins 34 and the screw member 32. The distinction between high-shear mixing and low-shear mixing is understood in the art, and in the present invention the degree of high-shear mixing preferred is one providing a maximum nominal velocity gradient G of at least about 500 seconds$^{-1}$, where the maximum nominal velocity gradient is equal to the maximum value of peripheral speed of the mixing rotor relative to the chamber wall 26 divided by the radial distance between the rotor surface and the adjacent surface of wall 26. In the present embodiment the maximum value of G occurs at the radially-outward ends of the mixing pins 34 and of the screw member 32. For example, if the rotor revolves at 3,000 revolutions per minute and the chamber is stationary, if the radius of the rotor at the mixing pins and at the edge of the screw member is 0.625 inch, and if the clearance between rotor and mixing chamber wall is 0.0625 inch, then the maximum nominal velocity gradient is $$\frac{2\pi \ (0.625 \times 3,000 \ \text{minutes}^{-1})}{0.0625}$$

or about 3,140 seconds$^{-1}$, corresponding to high-shear mixing in the preferred range.

The clearance between the periphery of the screw member and the mixing pins is preferably not greater than about 1/16 inch in most cases, to provide the desired high-shear mixing and to prevent solids from depositing on the walls of the chamber.

The material mixed in the mixing chamber comprises a liquid consisting principally of water delivered from liquid storage tank 12, and a solid delivered form solids storage bin 10. The solids material contains a particulate inorganic water-settable cement, together with a foam stabilizer comprising an inert particulate lamellar additive in an amount substantially equal to from about 0.2% to about 12%, by weight, of the solid material. Preferably the viscosity of the liquid component is less than 2.5 centipoises. A gas-forming agent is also delivered to the mixing chamber and this may be a part of the liquid from liquid storage tank 12 or of the solids from solids storage bin 10, or both, depending upon its nature as more fully discussed hereinafter. Part or all of the gas-forming agent may be fed to the mixing chamber from separate storage means.

The mixed material is continuously extruded from the outlet 60 of mixing chamber 16 into any convenient receptacle 62, which may be a mold or a building cavity as examples, and allowed to foam and set to produce the desired product.

The following examples are given for the purpose of illustration only and are not to be considered as limiting the scope of the invention in any way.

EXAMPLE 1

The mixing chamber 16 was provided by a right cylindrical pipe 28 having an inner diameter of about 1⅜ inches and a length of about 10 inches. Screw member 32 was helical with a diameter of about 1.25 inches, providing a clearance of about 0.062 inch from chamber wall 26. Eighteen equally-spaced pairs of mixing pins 34 were used, alternating pairs along the length of shaft 30 being at right angles to each other as shown in FIG. 1. The rotor speed was 3,000 revolutions per minute, giving a maximum nominal velocity gradient of about 3,140 seconds$^{-1}$.

The starting materials were as follows:

| Solids component: | Parts by weight |
| --- | --- |
| Calcined gypsum | 100 |
| Talc, U.S.P. grade | 4 |
| Manganese dioxide | 0.5 |
| Total | 104.5 |
| Liquid component: | |
| 35% hydrogen peroxide | 3.2 |
| Water | 54.8 |
| Total | 58.0 |

The solids component mixture was prepared by dry-blending the powdered components thereof in the above proportions. The liquid component was prepared by dissolving 35% hydrogen peroxide in water in the proportions given above.

The solids and liquid components were continuously delivered to mixing chamber 16 in the weight proportions 104.5 to 58, plus or minus about two percent. The feed rate to the chamber of the solids and liquid components combined was about 80 grams per second, and the void volume of the mixing chamber was occupied during operation by about 80 grams of material, so that the residence time in the mixer was about one second. If higher rates of throughput are used, then the mixer speed is preferably increased above 3,000 r.p.m. to maintain the same mixing energy per unit volume of material passed through the mixing chamber.

As is well known, even minute amounts of freshly set gypsum will accelerate the setting of a slurry of calcined gypsum. For this reason it is not practical, for most purposes, to mix gypsum slurries in continuous mixers of conventional design, because of the difficulty of avoiding the accumulation of minute quantities of the mixture in imperfectly agitated regions of the mixing chamber. Such accumulations cause an undesirable progressive acceleration of the setting rate of the discharged mixture over a relatively short period of continuous operation of the mixer. However, the particular design of the mixing device of FIG. 1 is especially advantageous because the present mixer may be used for extended periods of continuous operation, without engendering any significant progressive reduction in the setting time of a slurry of calcined gypsum. This desirable behavior may be explained by the following design feature: namely, that every point on the interior wall of the stator member which is in contact with the gypsum slurry is rapidly and continually subjected to the very small clearance by the helical rotor member, in fact, during each revolution of the rotor. Thus there is no opportunity for even minute amounts of the mixture to remain undischarged for any significant period of time, and the acceleration of settling is prevented.

EXAMPLE 2

To 1045 grams of the solids component of Example 1 were added 580 grams of the liquid component of Example 1 in a six-quart polyethylene vessel. The mixture was immediately stirred for 35 seconds using a batch-type, three-inch diameter propeller rotating at 1250 revolutions per minute. The slurry was then cast into a rectangular solid mold, and allowed to rise and set.

When fully dried, specimens of the foams of Examples 1 and 2 had bulk densities of 17.4 and 18.1 pounds per cubic foot, respectively, and crushing strengths of 384 and 98 pounds per square inch, respectively.

EXAMPLES 3-6

The procedure of Example 1 was repeated using the same formualtion, but the residence time in the mixer was varied by adjusting the total feed rate of solids and liquid components, while maintaining their ratio constant. The effect of the residence time in the mixing zone on the compressive strength of the foam is evident from the results shown in Table I.

TABLE I

| Example number | 3 | 4 | 5 | 6 |
|---|---|---|---|---|
| Mixer residence time, seconds | 10 | 0.5 | 10 | 0.5 |
| Rotor speed, r.p.m | 3,000 | 3,000 | 1,150 | 1,150 |
| Compressive strength, p.s.i | 117 | 391 | 112 | 380 |
| Bulk density, pounds per cubic foot | 17.4 | 19.0 | 19.1 | 17.8 |

EXAMPLES 7-10

In Examples 7 through 10, the formulations listed in Table II were prepared and mixed using the procedure and apparatus of Example 1. However the effluent of the slurry mixer was cast into rectangular molds, and allowed to foam and set, and then allowed to cure at room temperature and 100 percent relative humidity for 9 days. After curing, the specimens were stripped from the molds and allowed to dry out for 24 hours at room temperature. They were then measured for bulk density and compressive strength.

TABLE II

| Example number | 7 | 8 | 9 | 10 |
|---|---|---|---|---|
| Solids component, parts by weight: | | | | |
| Portland cement | 100 | 65 | 65 | 65 |
| Wollastonite, −300 mesh | | 35 | 35 | |
| Melamine-formaldehyde resin, dry | 2.5 | | | |
| Manganese dioxide | 1.0 | 1.0 | 1.0 | 1.0 |
| Talc | 2.5 | 6.0 | 6.0 | 4.0 |
| Ammonium lignin-sulfonate | | | | 0.15 |
| Silica flour | | | | 35 |
| Liquid component, parts by weight: | | | | |
| 35% aqueous hydrogen peroxide | 4.2 | 3.5 | 3.5 | 4.0 |
| Water | 61.0 | 67.0 | 67.0 | 56.5 |
| Mixer residence time, seconds | 2.4 | 2.4 | 12. | 3.1 |
| Bulk density, lb./cu. ft | 27.1 | 30.4 | 29.4 | 27.1 |
| Crushing strength, p.s.i | 380 | 394 | 135 | 412 |

EXAMPLES 11, 12 and 13

Examples 11 and 12, Table III, were prepared and mixed using the method and apparatus of Example 1. In Example 13, also Table III, the solids component and liquid component had the same compositions, respectively, as in Example 12, but the slurry was mixed batchwise for 30 seconds using a marine-type propeller, rather than with the continuous mixer of FIG. 1.

TABLE III

| Example number | 11 | 12 | 13 |
|---|---|---|---|
| Solids component, parts by weight: | | | |
| Calcined gypsum | 100 | 100 | 100 |
| Talc | 4.5 | | |
| Limestone, −40+100 mesh | 4.0 | 4.0 | 4.0 |
| Wollastonite | 6.0 | 5.0 | 5.0 |
| Aluminum flake | | 0.75 | 0.75 |
| Liquid component, parts by weight: | | | |
| Aluminum sulfate | 8.5 | 7.5 | 7.5 |
| Water | 55 | 55 | 55 |
| Mixer residence time, sec | 1.8 | 1.8 | 30 |
| Crushing strength, p.s.i | 297 | 258 | 92 |

The maximum nominal velocity gradients were calculated for each of the foregoing examples as follows:

EXAMPLES 14-16

In these examples, the formulations listed in Table V were prepared and mixed using the procedure and apparatus of Example 1. The mixtures were cast into molds, allowed to set for 24 hours at room temperature and then dried for two days at room temperature. The products were then measured for bulk density and compressive strength.

| Example number | 14 | 15 | 16 |
|---|---|---|---|
| Solids component, pts./wt.: | | | |
| High alumina cement (calcium aluminate) | 60 | 60 | 60 |
| Silica flour | 40 | | |
| Milled zircon | | 80 | |
| Calcined alumina | | | 60 |
| Talc | 8 | 8 | 7 |
| Manganese dioxide | 1.5 | 1.5 | 1.5 |
| Liquid component, pts./wt.: | | | |
| 35% aqueous hydrogen peroxide | 3.0 | 3.0 | 3.8 |
| Water | 42 | 42 | 41.2 |
| Borax | 0.3 | 0.2 | 0.2 |
| Mixer residence time, secs | 0.8 | 0.8 | 0.8 |
| Bulk density, lb./cu. ft | 21.4 | 34.9 | 22.0 |
| Crushing strength, p.s.i | 310 | 421 | 334 |

The foregoing compositions are excellent foam-in-place castable materials which set to a non-friable condition, and are especially useful as refractory insulating materials. The products are substantially stronger than conventional commercial light-weight refractory mortars and concretes of similar bulk density as is illustrated by comparing the foregoing compressive strength with that of Example 19. Examples 15 and 16 were dimensionally stable to temperatures over 2850° F.

The principal and essential components of the ultimate mixture are water-settable cement, water, gas-forming agent and lamellar foam-stabilizing agent. These are preferably divided between a liquid component and a solids component which are mixed according to the present invention. The liquid component consists principally of water, and preferably has a viscosity less than about 2.5 centipoises. When one of the components is water-soluble it may be incorporated in the water as part of the liquid component. Water-insoluble components, including the cement, the lamellar foam stabilizing agent and essentially water-insoluble gas-forming agents, may be, and preferably are, pre-blended to make up the solids component.

The cement, as stated, is of the water-settable, or hydraulic, type and examples of these are portland cement, high alumina (calcium aluminate) cement and calcined gypsum. Such materials are well known and have been used in water-settable cellular foamed materials in the past. The cement is a major material in the solids component, and generally makes up at least 40%, by weight, thereof.

An important feature of the present invention is the inclusion of the water-insoluble lamellar particulate foam stabilizing agent. The average diameter of the lamellar particles is generally less than about 1 millimeter and the ratio of the average diameter of the particles to the average particle thickness is greater than about 5:1. Examples of such lamellar materials are talc, mica, graphite, pulverized vermiculite, metal flakes like aluminum and bronze, and the like. The amount of lamellar foam stabilizing agent used is from about 0.2 to about 12%, by weight, based on the wieght of the solids component.

Gas forming agents for use in preparing cellular foamed products of the type under consideration are well known. Hydrogen peroxide catalyzed by manganese dioxide, copper oxide or catalase is an example of one such type. In accordance with the present invention, the hydrogen per-

TABLE IV

| Example number | 1 | 2 | 3 | 4 | 5 | 6 | 7 | 8 | 9 | 10 | 11 | 12 | 13 |
|---|---|---|---|---|---|---|---|---|---|---|---|---|---|
| Rotor, revolutions/minute | 3,000 | 1,250 | 3,000 | 3,000 | 1,150 | 1,150 | 3,000 | 3,000 | 3,000 | 3,000 | 3,000 | 3,000 | 1,250 |
| Clearance, inches | 0.62 | *1.75 | 0.62 | 0.62 | 0.62 | 0.62 | 0.62 | 0.62 | 0.62 | 0.62 | 0.62 | 0.62 | *1.75 |
| Rotor diameter, inches | 1.25 | 3 | 1.25 | 1.25 | 1.25 | 1.25 | 1.25 | 1.25 | 1.25 | 1.25 | 1.25 | 1.25 | 3 |
| Maximum nominal velocity gradients, sec.$^{-1}$ | 3,140 | 112 | 3,140 | 3,140 | 1,200 | 1,200 | 3,140 | 3,140 | 3,140 | 3,140 | 3,140 | 3,140 | 112 |

* Based on a 3-inch diameter propeller centered in a 6.5 inch diameter mixing vessel.

oxide may be included with the water in the liquid component and the catalyst may be included in the solids component. Another example of a gas forming agent is the combination of a carbonate, such as calcium carbonate, with an acid or acid salt, such as aluminum sulfate, which react in water to form carbon dioxide, and is particularly useful in conjunction with calcined gypsum as the cement. The acid or acid salt may be included in the liquid component and the carbonate in the solids component. Another combination which reacts in water to liberate a gas is a metal-nitrite, like calcium nitrite, and an ammonium salt, like ammonium sulfate. The metal nitrite may be included in the solids component and the ammonium salt may be included in the liquid component. Particles of aluminum or of zinc metal will also form gas in alkaline aqueous media and these may be used as part of the solids component, especially in conjunction with portland cement and high alumina cement. The amount of gas forming agent employed will depend, of course, upon the particular one selected as is well known to those skilled in the art.

Other materials which do not materially and adversely affect the character of the principal constituents may be included. For example, a finely-divided inert filler or reinforcing agent may also be included in the solids component in an amount up to about 60%, by weight, based on the weight of the solids component. Examples of such fillers are wollastonite, silica flour, zircon, alumina, limestone, and the like. Water-soluble or water-dispersible synthetic resins and set retarders, like borax, may also be included.

Figure 3A:
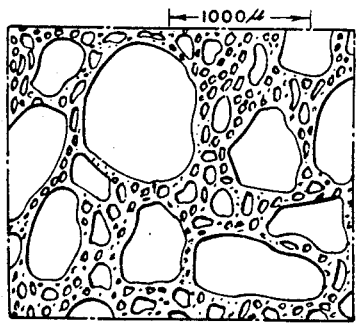
FIG. 3A is an enlraged fragmentary view of a section through a foamed material of the prior art.
Figure 3B:
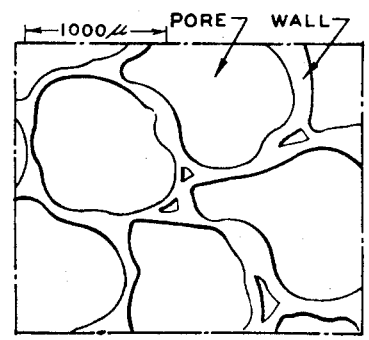
FIG. 3B is an enlarged fragmentary view of a section through a foamed material of the invention.
Figure 4:
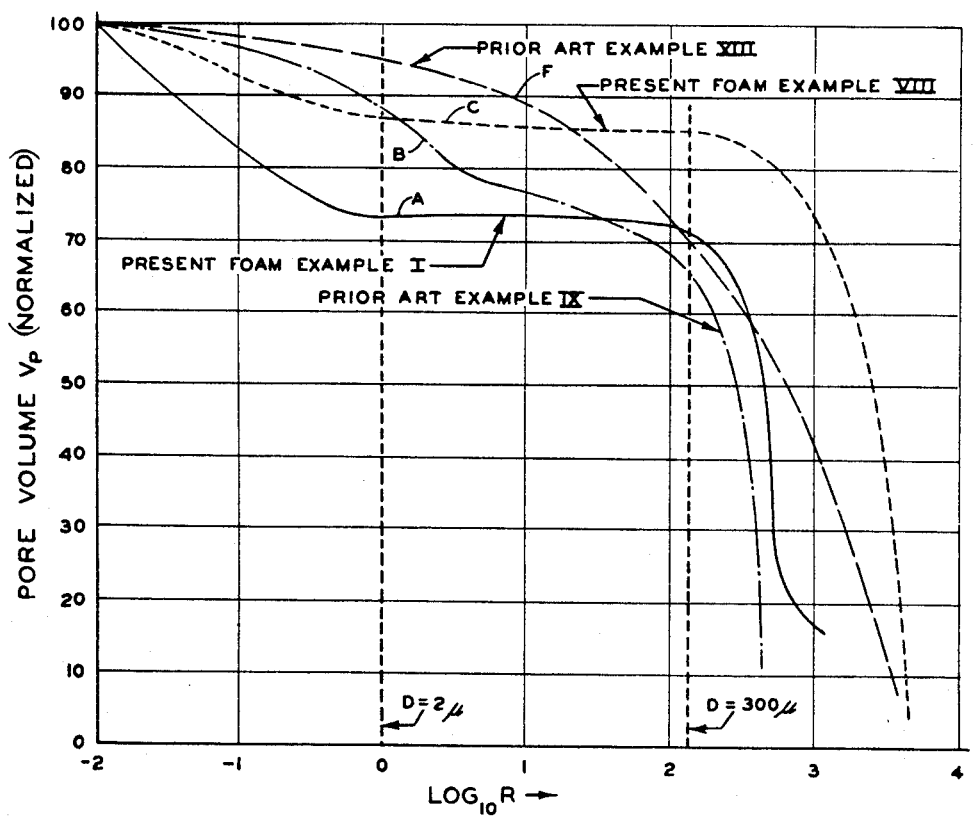
FIG. 4 is a graphical representation to which reference will be made in explaining and defining the pore structure of the invention in contrast to that of the prior art.

FIGS. 3A, 3B and 4 illustrate important distinctions between the pore structure typical of the material of the invention and that typical of the prior art. As seen in FIG. 3A, a cement-based foamed material of the prior art is replete with small pores which, upon examination, prove to include a large number in the range of 2–300 microns in effective diameter. The term "effective diameter" is utilized herein because the pores are in general not perfectly spherical, and "effective diameter" is defined for the present purposes, as the diameter of a sphere having the same volume as the pore in question. In the pore structure of the invention illustrated in FIG. 3B, pores having effective diameters in the range 2–300 microns are rare, the few apparent small pores in the figure in fact being corners of larger pores which were cut in preparing the section. It is believed that the substantial absence of pores in the 2–300 micron range of effective diameters is responsible for the improved compressive strengths of the material of the invention, which is typically several times greater than that of similar prior-art materials.

FIG. 4 illustrates this distinction in terms of the percentage of pore volume due to pores having various effective diameters. Thus abscissae represent effective pore radius R (one-half of the effective diameter D) to a logarithmic scale, i.e. $\log_{10} R$ in microns, while ordinates represent the percentage of the total pore volume which is produced by pores having effective radii greater than each corresponding value of R lying on the curves of the graph; for example, curve B shows that about 77% of the pore volume of the sample produced by the process of Example 9 is due to pores having effective radii greater than about ten microns (effective diameters greater than twenty microns). It will be understood that the difference in ordinates of any two points on one of the curves therefore represents the percentage of pore volume due to pores having radii between the two values represented by the two points, and that where a curve is substantially horizontal throughout a given range of R there are substantially no pores having radii in that range. Referring to the graphs at A and C of FIG. 4, coresponding to foam samples produced by the inventive processes of Examples 1 and 8, respectively, it will be seen that both of these graphs are substantially horizontal throughout the range from $\log_{10} R = 0$ to $\log_{10} R = 2.18$, i.e. throughout a range of effective diameter D extending from about 2 to 300 microns.

In contrast, the curves B and F, produced by the processes of Examples 9 and 13 and not using the present invention, have very substantial slopes in the range 2–300 microns, indicating the presence of substantial numbers of pores having effective diameters in that range. For example, graph B shows an increase from about 66 to 88 in the range 2–300 microns, indicating that about 22% of the pore volume is due to pores in this range; graph F shows an increase from about 69 to 95 in the range 2–300 microns, indicating that about 26% of the pore volume is due to pores in this range. It is believed that the substantial elimination of pores having diameters in this range is responsible for the improved mechanical properties of the material of the invention.

Preferably at least about 97% of the pore volume is provided by pores having effective diameters outside the range 2–300 microns, and in a preferred embodiment the greater part of the pore volume is provided by pores having effective diameters in the range from about 300 to 8,000 microns, preferably concentrated in the 1,000 to 3,000 micron range as illustrated in FIG. 3B and as provided by the prefered embodiment of the process of the invention.

Various methods are known for determining pore sizes. Among these are the methods of mercury intrusion and optical microscopy. Mercury intrusion methods are particularly suitable for use in the range of 0.02 to 200 microns effective diameter, using pressures up to about 10,00 p.s.i. In this known method, the surface tension of the applied mercury tends to oppose its entry into small pores, and increasing the applied pressure causes the mercury to penetrate progressively smaller pores, substantially according to the relation:

$$PR = 2\phi \cos \theta,$$

where

P = applied pressure
R = port radius
$\phi$ = surface tension of mercury
$\theta$ = contact angle.

For most inorganic oxides, the contact angle of mercury is about 130°, which is the value assumed in the foregoing measurements. Such measurements are described, for example, in the book entitled "Fine Particle Measurement" b'y C. Orr and and J. M. Della Valle, MacMillan Company, New York, 1959. Suitable instruments for the mercury intrusion measurements are commercially available. For measurement of the larger pores, a conventional calibrated optical microscope is suitable.

EXAMPLES 17–19

Regardless of the particular manner and speed of mixing and the pore-size distribution in the mixture, compositions based on the high alumina cement, particulate lamellar foam stabilizing agent, gas-forming agent and water have superior strength to materials made using other foam-stabilizing agents.

Example 17 was prepared and mixed using the method and apparatus of Example 1 using, however, a nonionic surfactant, polyoxyethylene-polyoxypropylene glycol, as foam-stabilizing agent. It was cast into a mold, allowed to set for 24 hours at room temperature, and then dried for two days at room temperature.

Example 18 was mixed under low shear conditions, using a 3-inch diameter propeller rotating at 1250 revolutions per minute and centered in a 6.5 inch diameter mixing vessel. After mixing for the specified time, the mixture was cast into a mold, allowed to set for 24 hours at room temperature, and the dried for two days at room temperature.

Example 19, which represents a conventional commercial lightweight refractory motar, was prepared by blending the specified components for about two minutes, during which the vermiculate aggregate was not reduced to individual, fine lamellar particles. The resulting mixture was moist but granular, due to the high water absorption of the vermiculate aggregate, and could not be case whereas Examples 17 and 18 were castable. The moist granular mass was tamped into a mold, and allowed to harden and dry similar to Examples 14 through 18.

TABLE VI

| Example number | 17 | 18 | 19 |
|---|---|---|---|
| Solids component, pts./wt.: | | | |
| High alumina cement (calcium aluminate) | 60 | 60 | 60 |
| Silica flour | 40 | 40 | |
| Talc | | 8 | |
| Manganese dioxide | 1.5 | 1.5 | |
| Vermiculate aggregate | | | 40 |
| Liquid component, pts./wt.: | | | |
| 35% aqueous hydrogen peroxide | 3.0 | 3.0 | |
| Water | 42 | 42 | 130 |
| Borax | 0.3 | 0.3 | |
| Polyoxyethylene-polyoxypropylene glycol | 0.2 | | |
| Mixer residence time, seconds | 0.8 | 15 | |
| Bulk density, lb./cu. ft | 20.2 | 23.4 | 35.5 |
| Crushing strength, p.s.i | 74 | 112 | 92 |

Although the strength of the product of Example 18 is inferior to that of the preceding examples in which high-shear, short time mixing was used, it is superior to those of Examples 17 and 19. Moreover, the product of Examples 17 and 19 was friable whereas the product of Example 18 was non-friable.

While the invention has been described with particular reference to specific embodiments thereof in the interest of complete definiteness, it will be understood that it may be embodied in any of a variety of forms diverse from those specificaly described without departing from the scope of the invention as defined by the appended claims.

I claim:
1. A solid, water-set cellular foamed material including an inorganic hydraulic cement and a lamellar foam-stabilizing agent, in which substantially all of the pore volume of said foamed material is provided by pores having effective diameters outside a range extending from about two microns to about 300 microns and in which the greater part of said pore volume is provided by pores having effective diameters in the range from about 300 to about 8000 microns.

2. The material of claim 1, in which at least about 97% of said pore volume is provided by pores having effective diameters outside said two micron to 300 micron range.

3. The material of claim 1, in which the greater part of said pore volume is provided by pores having effective diameters in the range from 1000 to 3000 microns.

4. The material of claim 1 containing said particulate lamellar foam-stabilizing agent in an amount from about 0.2 to about 12% by weight, based on the weight of the solids.

5. A solid, water-set celular foamed material consisting essentially of calcium aluminate cement and a particulate lamellar foam-stabilizing agent in an amount from about 0.2 to about 12%, by weight.

6. In the preparation of solid, water-set cellular foamed materials wherein calcium aluminate cement, water and a gas forming agent are mixed and the mixture is allowed to set, the improvement wherein there is included in the mixture an inert particulate lamellar material in an amount from about 0.2 to about 12%, by weight, based on the weight of the solids.

References Cited
UNITED STATES PATENTS

| 3,579,366 | 5/1971 | Rehmar | 196—86 |
| 2,915,802 | 12/1959 | Dugas | 106—87 |
| 2,898,220 | 8/1959 | Ulfstedt et al. | 106—87 |
| 2,598,980 | 6/1952 | Denning | 106—86 |
| 2,282,190 | 5/1942 | Beyrouth | 106—87 |
| 2,371,928 | 7/1943 | Schneider | 106—87 |

JAMES E. POER, Primary Examiner

U.S. Cl. X.R.

106—190